US00RE48073E

(19) United States
(12) Reissued Patent
Macauley

(10) Patent Number: US RE48,073 E
(45) Date of Reissued Patent: Jun. 30, 2020

(54) METHODS OF DEPLOYING A SERVER

(71) Applicant: CommScope, Inc. of North Carolina, Hickory, NC (US)

(72) Inventor: Daniel W. Macauley, Fishers, IN (US)

(73) Assignee: CommScope, Inc. of North Carolina, Hickory, NC (US)

(21) Appl. No.: 15/881,530

(22) Filed: Jan. 26, 2018

Related U.S. Patent Documents

Reissue of:
(64) Patent No.: 9,246,758
Issued: Jan. 26, 2016
Appl. No.: 13/906,732
Filed: May 31, 2013

U.S. Applications:
(62) Division of application No. 12/708,724, filed on Feb. 19, 2010, now Pat. No. 8,472,333.

(60) Provisional application No. 61/154,578, filed on Feb. 23, 2009.

(51) Int. Cl.
*H04L 12/24* (2006.01)

(52) U.S. Cl.
CPC ..... *H04L 41/12* (2013.01); *H04L 41/0806* (2013.01); *H04L 41/0681* (2013.01)

(58) Field of Classification Search
CPC .. H04L 41/0806; H04L 41/12; H04L 41/0681
USPC ..... 370/254, 256; 709/220–226
See application file for complete search history.

(56) References Cited

U.S. PATENT DOCUMENTS 6,470,025 B1 10/2002 Wilson et al.
6,816,905 B1 * 11/2004 Sheets ..... G06F 9/5061 709/226
8,472,333 B2 6/2013 Macauley
9,246,758 B2 1/2016 Macauley
2003/0069960 A1 4/2003 Symons et al.
2005/0177746 A1 8/2005 Bunn et al.
2005/0256961 A1 11/2005 Alon et al.
2005/0262233 A1 11/2005 Alon et al.
2006/0010176 A1 1/2006 Armington
2006/0031476 A1 2/2006 Mathes et al.
2006/0047800 A1 3/2006 Caveney et al.
2008/0288623 A1 * 11/2008 Malik ..... 709/223
2009/0019137 A1 * 1/2009 Mishra et al. ..... 709/220
2009/0055897 A1 * 2/2009 Morgan et al. ..... 726/3
2010/0157516 A1 * 6/2010 Doorhy ..... H04L 41/0806 361/679.02

(Continued)

FOREIGN PATENT DOCUMENTS

EP 1734692 A1 12/2006
WO 2005109195 A2 11/2005

OTHER PUBLICATIONS

"IBM Tivoli Monitoring", IBM Corporation Software Group, 2007, pp. 1-8, IBM Corporation.

(Continued)

*Primary Examiner* — Ovidio Escalante
(74) *Attorney, Agent, or Firm* — Fogg & Powers LLC

(57) ABSTRACT

Methods of deploying a new server that will receive a set of services include receiving a request to deploy the new server, automatically selecting a location for the server based on a set of rules, and automatically determining the hardware and configuration changes that are necessary to deploy the server at the selected location and to provide the set of services to the server.

21 Claims, 7 Drawing Sheets

(56) References Cited

U.S. PATENT DOCUMENTS

2010/0211669 A1* 8/2010 Dalgas et al. ..... G06F 9/5027 709/224
2012/0136995 A1 5/2012 Wang et al.

OTHER PUBLICATIONS

International Bureau, "Notification Concerning Transmittal of International Preliminary Report on Patentability from PCT Application No. PCT/US2010/024541 dated Sep. 1, 2011", from Foreign Counterpart to U.S. Appl. No. 12/708,724, Sep. 1, 2011, pp. 1-14, Published: Switzerland.
International Searching Authority, "Invitation to Pay Additional Fees from PCT Application No. PCT/US2010/024541 dated May 19, 2010", from Foreign Counterpart to U.S. Appl. No. 12/708,724, May 19, 2010, pp. 1-7, Published: EP.
International Searching Authority, "Notification of Transmittal of the International Search Report and the Written Opinion of the International Searching Authority from PCT Application No. PCT/US2010/024541 dated Jul. 29, 2010", from Foreign Counterpart to U.S. Appl. No. 12/708,724, Jul. 29, 2010, pp. 1-23, Published: EP.
U.S. Patent and Trademark Office, "Advisory Action", U.S. Appl. No. 12/708,724, filed Feb. 12, 2013, pp. 1-6, Published: US.
U.S. Patent and Trademark Office, "Final Office Action", U.S. Appl. No. 12/708,724, filed Dec. 6, 2012, pp. 1-14, Published: US.
U.S. Patent and Trademark Office, "Notice of Allowance", U.S. Appl. No. 12/708,724, filed Feb. 25, 2013, pp. 1-8, Published: US.
U.S. Patent and Trademark Office, "Notice of Allowance", U.S. Appl. No. 13/906,732, filed Sep. 23, 2015, pp. 1-6, Published: US.
U.S. Patent and Trademark Office, "Office Action", U.S. Appl. No. 12/708,724, filed Jun. 14, 2012, pp. 1-14, Published: US.
U.S. Patent and Trademark Office, "Office Action", U.S. Appl. No. 13/906,732, filed Jan. 15, 2015, pp. 1-13, Published: US.
U.S. Patent and Trademark Office, "Office Action", U.S. Appl. No. 13/906,732, filed May 21, 2015, pp. 1-12, Published: US.
U.S. Patent and Trademark Office, "Restriction Requirement", U.S. Appl. No. 12/708,724, filed Apr. 5, 2012, pp. 1-6, Published: US.
UK Intellectual Property Office, "Examination Report from GB Application No. 1112290.0 dated Jan. 23, 2015", from Foreign Counterpart to PCT Application No. PCT/US2010/024541, dated Jan. 23, 2015, pp. 1-5, Published: UK.
UK Intellectual Property Office, "Examination Report from GB Application No. 1112290.0 dated Apr. 22, 2015", from Foreign Counterpart to PCT Application No. PCT/US2010/024541, dated Apr. 22, 2015, pp. 1-4, Published: UK.
UK Intellectual Property Office, "Examination Report from GB Application No. 1112290.0 dated Sep. 15, 2014", from Foreign Counterpart to PCT Application No. PCT/US2010/024541, Sep. 15, 2014, pp. 1-4, Published: UK.
Notification of Transmittal of the International Search Report and the Written Opinion of the International Searching Authority, or the Declaration, International Search Report, Written Opinion of the International Searching Authority, PCT/US2010/024541, Date of mailing Jul. 29, 2010, 23 pages.
IBM Corporation, "IBM Tivoli Monitoring", 2007, XP002591563, Retrieved from the Internet: URL: http://www.comoptics.com.mx/descargas/TID14003-USEN-00.pdf, retrieved on Jul. 12, 2010, 8 pages.
International Preliminary Report on Patentability Corresponding to International Application No. PCT/US2010/024541; Date of Mailing: Sep. 1, 2011, 14 pages.
Examination Report corresponding to GB Application No. GB1112290.0, Date of Report: Sep. 15, 2014, 3 pages.

* cited by examiner

METHODS OF DEPLOYING A SERVER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATION

*This Reissue Application is a reissue of application Ser. No. 13/906,732 filed May 31, 2013, which issued as U.S. Pat. No. 9,246,758.* This application claims priority under 35 U.S.C. §120 as a divisional of U.S. patent application Ser. No. 12/708,724, filed Feb. 19, 2010, now U.S. Pat. No. 8,472,333, which in turn claims priority from U.S. Provisional Patent Application No. 61/154,578, filed on Feb. 23, 2009, the disclosure of each of which is incorporated herein by reference as if set forth [fully] herein.

FIELD OF THE INVENTION

The present invention relates generally to communications systems and, more particularly, to monitoring changes that are made in a communications network.

BACKGROUND

Dedicated communications networks are commonly used to enable computers, printers, network servers, memory devices and the like to communicate with each other, and to communicate with devices in remote locations via a communications service provider. These communications networks are often hard-wired using twisted pair and/or fiber optic communications cables. A communications patching system and network switches are typically used to interconnect the various communication cables and to connect the cables to end devices such as computers, network servers, memory devices, and the like. As is known to those of skill in the art, technicians may use communications cables to connect each end device to a patching and switching field and then using patch cords in the patching and switching field to selectively interconnect the end devices.

Dedicated communications networks of the type described above are most commonly used to implement local area networks in commercial office buildings. In such applications, individual service ports that are commonly referred to as wall jacks are located in offices throughout the building, and "horizontal" communications cables run from each such wall jack through the walls and ceilings of the building into a computer room or telecommunications closet. Each "horizontal" cable is terminated into an individual service port of one of the patch panels of the patching system. Network equipment such as network servers are also connected to the service ports on the patch panels through network switches so that each computing device that is connected to a wall jack may be in communication with the appropriate network equipment.

A "data center" is a facility that may be used to run the computer-based applications that handle the core business and operational data of one or more organizations. Data centers are typically used to host large numbers of network servers, memory storage devices and other equipment. The expansion of the Internet has also led to a growing need for a special type of data center. In particular, businesses making sales and/or providing services over the Internet often require high-speed Internet connectivity, tight information security and non-stop operation with 24-hour a day support by a highly trained technical staff. Major Internet-based companies such as online retailers, Internet portals and search engine companies run large "Internet data centers" that host thousands or tens of thousands of servers along with thousands of associated patch panels, routers, network switches, memory devices and the like that are used to provide large numbers of users (i.e., client computers) simultaneous, secure, high-speed, fail-safe access to their web sites.

In many instances, these Internet data centers may be configured to provide double or even triple redundancy with respect to power feeds, backup power supplies, communications lines, memory storage and processing, and may have automated back-up capabilities. Data centers may also have layered network security elements including, for example, firewalls, VPN gateways, intrusion detection systems and the like. Data centers also may include monitoring systems that monitor the networked computer equipment and/or the applications running on the servers. Typically, a data center will have network design rules that specify the amount of redundancy, network security and the like that will be provided with respect to network servers, switches and other equipment. These network design rules, in effect, provide a guarantee as to the robustness of the data center operations. This can be a very important consideration for organizations that operate their online business activities through a data center, as the failure of a network will typically result in a direct loss of sales.

A virtual local area network (VLAN) is a local area network (LAN) with a definition that maps devices within a network on some other basis than geographic location. VLAN technology enables logical grouping of data network nodes and related data transport infrastructure to extend LANs beyond the restrictions imposed by the underlying infrastructure. A VLAN controller or switch is conventionally provided to change or add devices connected to a VLAN. VLANs are used to provide services to particular devices. In the data center context, exemplary VLAN services include providing connectivity to a particular LAN such as a LAN having access to outside networks such as the Internet, providing connectivity to memory storage devices, providing connectivity to a backup LAN and providing connectivity to a remote console LAN.

In order to provide a device (e.g., a server) with the services provided by a particular VLAN, a network administrator or other similar person "provisions" the VLAN service to the device at issue after receiving a work order (e.g., a paper work order, electronic work order, etc.). To provision the VLAN service to the device, the administrator may need to set up and/or rearrange equipment, wiring, and/or patch panel connections, and may also require the manual configuration of one or more switches. Provisioning a VLAN service to a device may, for example, require the manual reconfiguration of a network switch to provide the requested VLAN service to the device. Thus, in provisioning a VLAN service, some or all of the following may need to be performed: install cabling, install patch panels, make patching changes, make changes in intermediate patching devices (e.g., consolidation points), install or move devices, troubleshoot connection problems, configure network switches and other network equipment, etc.

The equipment configurations within a data center often experience large amounts of change over time. Switches, servers, routers, patch panels and the like are routinely being added, replaced or removed, and large numbers of changes can occur on even a daily basis. Likewise, the services provided to any particular end device may also experience large amounts of change over time, requiring reconfiguration of VLAN switches, patching changes and the like to provide the requested services. Similarly, new services may be made available over time, which likewise requires the addition of new VLAN switches and the configuration thereof.

SUMMARY

Embodiments of the present invention provide methods of automatically monitoring changes made to the communications connections into a server. Pursuant to these methods, an identification is made that a change was made to the communications connections into the server. A determination is then made if the identified change complies with a set of predetermined rules. If it is determined that the change does not comply with at least one of the rules in the set of pre-determined rules, then an alert is automatically issued.

In some embodiments, the change to the communications connections may comprise a change to the configuration of a VLAN switch. In other embodiments, the change may comprise a patching change. The set of predetermined rules may includes redundancy rules. Moreover, in some embodiment, these methods may further include determining if the change made to the communications connection was a pre-scheduled change and automatically issuing an alert if it is determined that it was not.

Pursuant to further embodiments of the present invention, methods of automatically issuing an alert when an unauthorized change is made to a network that alters the services provided to a server in the network are provided. Pursuant to these methods, an identification is made that a change was made to a communications connections into the server. A determination is then made as to whether the identified change was a pre-scheduled change. An alert is automatically issued if the change was not pre-scheduled.

In some embodiments, the identified change made to the communications connections may comprise a change to the configuration of a VLAN switch or a patching change. The identification that a change was made to the communications connections into the server may be performed by (1) determining the patching connections into the server, (2) mapping the patching connections to associated services to identify the services provided to the server and (3) identifying that a change was made to a VLAN switch that altered the services being provided to the server. These methods may also include determining if the change made to the communications connection complies with a set of pre-determined rules and automatically issuing an alert if the change does not comply with at least one of the rules in the set of predetermined rules.

Pursuant to still further embodiments of the present invention, methods of deploying a new server that will receive a set of services are provided. Pursuant to these methods, a request to deploy the new server is received. A location for the server is automatically selected based on a set of rules. The hardware and configuration changes that are necessary to deploy the server at the selected location and to provide the set of services to the server are then automatically determined.

In some embodiments, the location selected for the server may be further based on the number and/or type of hardware and configuration changes that would be required to deploy the set of services to the server to at least some of the available locations. Moreover, the methods may further involve automatically issuing work orders for at least some of the hardware and configuration changes that are necessary to deploy the server at the selected location and to provide the set of services to the server. The methods may also involve automatically monitoring to determine if the hardware and configuration changes that are necessary to deploy the server at the selected location and to provide the set of services to the server are performed correctly and/or within pre-specified time periods.

DETAILED DESCRIPTION

Figure 1:
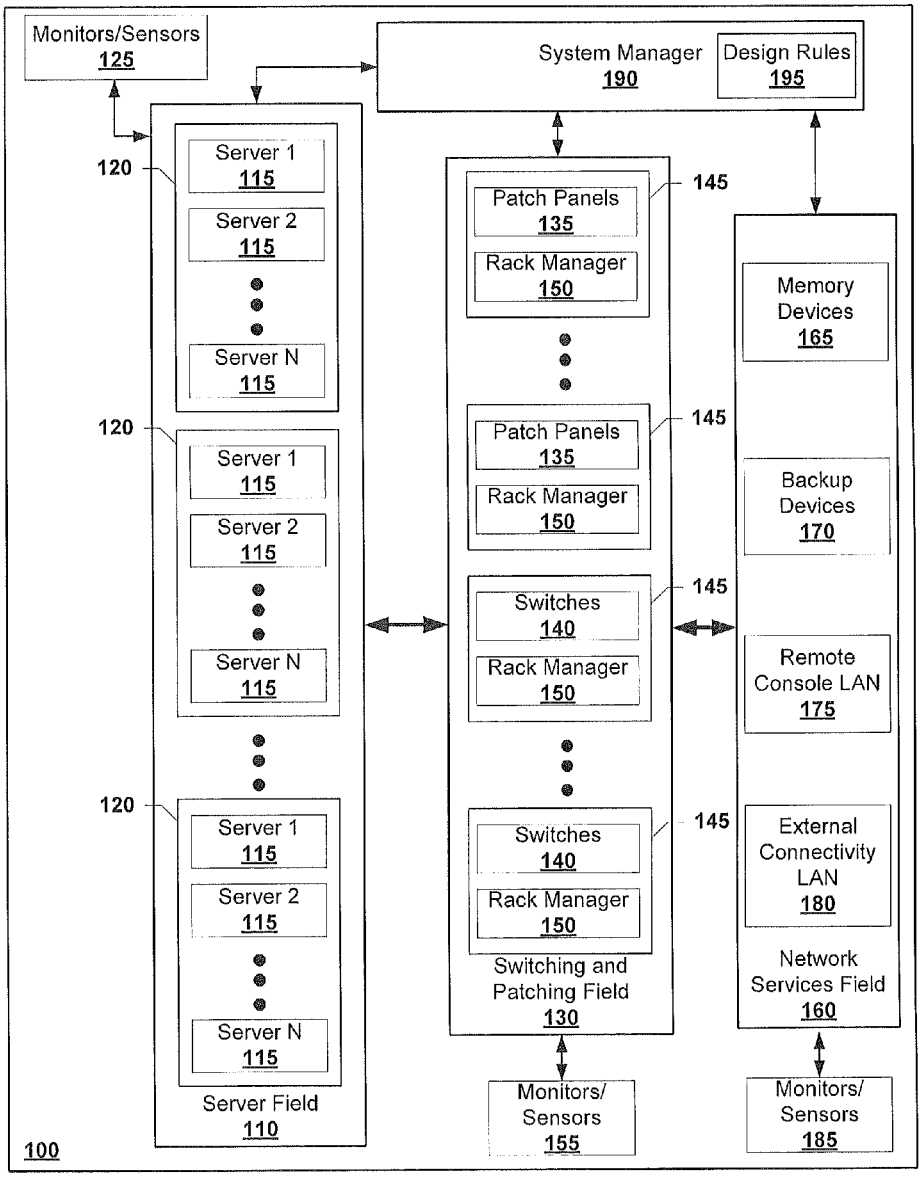
FIG. 1 is a block diagram of a data center in which the methods according to embodiments of the present invention may be used.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" to another element, it can be coupled directly to the other element, or intervening elements may also be present. In contrast, when an element is referred to as being "directly coupled" to another element, there are no intervening elements present.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. As used herein, the term "and/or" includes any and all combinations of one or more of the associated listed items.

Certain embodiments of the present invention are described herein with reference to flowchart and/or block diagram illustrations, it will be understood, however, that these figures illustrate exemplary embodiments and are not limiting. Moreover, it will also be understood that, in other implementations, the function(s) noted in the blocks may occur out of the order described, that the functions described in separate blocks may be combined, and/or that the functions described in a single block may be broken out into multiple blocks.

It will be understood that each block of the flowchart and/or block diagram illustrations, and combinations of blocks in the flowchart and/or block diagram illustrations, may be implemented by computer program instructions and/or hardware operations. These computer program instructions are provided to a processor of, for example, a system manager or other controller, to produce a machine, such that execution of the instructions by the processor create means for implementing the functions specified in the flowchart and/or block diagram block or blocks.

These computer program instructions may be stored in a computer usable or computer-readable memory, such that the instructions stored in the computer usable or computer-readable memory produce an article of manufacture including instructions that implement the function specified in the flowchart and/or block diagram block or blocks. Likewise, execution of the computer program instructions may cause a series of operational steps to be performed to produce a computer implemented process such that the instructions that execute on the controller or other programmable apparatus provide steps for implementing the functions specified in the flowchart and/or block diagram block or blocks.

Embodiments of the present invention provide methods, systems and computer program products for automatically monitoring changes that are made to communications connections into a server. These changes may be patching changes that physically modify the cabling connecting the server to other end devices and/or changes to the configuration of switches such as VLAN switches that reconfigure the services provided to the server. As noted above, data centers may host thousands or even tens of thousands of servers, with dozens or even hundreds of equipment and service changes occurring on a daily basis. With such large numbers of servers, and so many equipment configuration and services changes, it is increasingly difficult to manage the services that are connected to each server. The methods and systems according to embodiments of the present invention may be used to alert an administrator when unauthorized changes (i.e., changes that were not pre-scheduled) are made to the network that, for example, alter the services provided to a server.

As changes are made in a data center, it can also become very difficult to determine if the changes violate any of the network design rules such as, for example, redundancy requirements or rules regarding the types of devices that may be directly connected to other devices, etc. The methods, systems and computer program products according to embodiments of the present invention may also be used to determine if any particular hardware or configuration change that is made violates any of the network design rules. Additionally, methods of deploying servers are also provided that may be used to, for example, automatically select a location for the new server and to automatically determine the patching and switch configuration changes necessary to provision the desired services to the new server.

FIG. 1 is a block diagram of a data center 100. As shown in FIG. 1, the data center 100 can be functionally divided into three primary components: a network server field 110, a switching and patching field 130 and a network services field 160. The network server field 110 may include hundred, thousands or even tens of thousands of network servers 115 (or other types of processing devices). These servers 115 are typically mounted on or in equipment racks or cabinets 120, with a plurality of network servers or other devices (e.g., 6 to 20 pieces of equipment) mounted on each rack 120 or within each cabinet 120. Additionally, a plurality of environmental sensors 125 may be provided throughout the network server field 110 that monitor environmental conditions such as, for example, cabinet temperatures, humidity and airflow levels; water/flood detection; smoke detection; electrical power consumption; cabinet door open/close detection, and movement (e.g., vibration, physical movement, etc.).

The patching and switching field 130 comprises a large number of patch panels 135 and network switches 140. As is known to those of skill in the art, a patch panel is a device that includes a plurality of connector ports. Each connector port is configured to connect one or more communications cables or patch cords that are connected to a front side of the port to one or more cables or patch cords that are connected to the back side of the port. The network switches 140 likewise each include a plurality of connector ports and can be used to provide switchable connections between those connector ports and end devices that are connected to each switch 140. Some of these switches 140 may comprise VLAN switches 140 that are configured to provide access to one or more VLAN services. The VLAN switches 140 may be any type of network equipment that can be connected to a patch panel and through which access can be obtained to one or more VLAN services. Patch cords (not illustrated) are used to selectively interconnect respective connector ports on the patch panels 135 with connector ports on the VLAN switches 140 so as to provide individual communications channels that give devices such as the servers 115 access to one or more VLAN services. The term "individual communication channel" means the structured wiring that provides a connection between a first end device (e.g., one of the servers 115) and a second end device (e.g., equipment in the network services field 160). Since the patch cords may be readily unplugged from one connector port of a patch panel 135 or switch 140 and then plugged into another connector port on the same or different patch panel 135 or switch 140, the patching and switching field 130 provides a means by which a technician can quickly and easily change the connections between end devices.

The patch panels 135 and network switches 140 are typically mounted on or in equipment racks or cabinets 145. Each rack/cabinet 145 may include a rack manager 150 that is mounted thereon or otherwise associated with the equipment mounted on or within the rack or cabinet 145. Each rack manager 150 may be used to automatically keep an accurate log of all changes that have occurred with respect to the patch cords on a respective one of the equipment racks 145. The rack managers 150 may also be configured to provision Virtual Local Area Network (VLAN) services in the switching and patching field 130. In some embodiments, the rack managers 150 may each comprise a controller that includes a central processing unit (CPU) that is configured to execute software that implements the functionality of the rack managers 150 described herein. Additionally, a plurality of environmental sensors 155 may be provided throughout the patching and switching field 130 that monitor various environmental conditions.

The network services field 160 includes a plurality of end devices such as memory devices 165, backup devices 170, remote consoles 175 and external connectivity LANs 180 which provide external network connections. Each of these devices thus provide a service which can be made available to selected of the network servers 115. VLAN switches 140 are provided in the patching and switching field 130 which are used to selectively provide these services to the network servers 115 based on the needs and configuration of each network server 115. As discussed above, the service is provided by configuring the VLAN switch 140 and the patching connections so as to provide a communications channel between the end device providing the service (e.g., a memory device 175 and a selected one of the network servers 115). The network services field 160 may also include a plurality of environmental sensors 185.

As noted above, a rack manager 150 is associated with each rack/cabinet 145 in the patching and switching field 130. These rack managers 150 may be in communication with each patch panel 135 and/or network switch 140 that is mounted on the equipment rack/cabinet 145. The patch panels 135 (and, in some cases, the network switches 140) may comprise "intelligent" patch panels 135 or "intelligent" switches 140 that are capable of automatically determining when a patch cord is plugged into or removed from any of their connector ports. Moreover, these intelligent patch panels and switches can also determine, either by themselves or in conjunction with other equipment such as the rack managers 150 and/or a system manager 190 (which is discussed below), the specific connector port on another patch panel 135 or network switch 140 that a patch cord that is plugged into a connector port on a first patch panel or switch is connected to. Intelligent patching systems which provide such automatic connectivity tracking capabilities are described, for example, in U.S. Pat. Nos. 6,350,148 and 6,222,908.

As noted above, the data center 100 further includes a system manager 190 that is coupled to each of the rack managers 150 that are provided throughout the switching and patching field 130. The system manager 190 may also be coupled to equipment in the server field 110 and/or to equipment in the network services field 160. The system manager 190 includes a database of the hard-wired connections between the various end devices and the patching and switching field 130 for all of the end devices in the data center 100. As noted above, the rack managers 150 sense changes in the patch cord connections in the patching and switching field 130, and feed information regarding these changes to the system manager 190. This allows the system manager 190 to automatically track the end-to-end connections throughout the data center 100.

The network design rules 195 for the data center 100 may also be programmed into the system manager 190. As will be discussed in detail below, the intelligent patching capabilities may be used to monitor the individual communications channels to see what services each channel has, and to determine if those in fact are the services that are supposed to be provided for each channel. Moreover, each channel can also be compared to the network design rules 195 to determine if each channel is in compliance with those rules 195. If the proper services are not being provided, or if the network design rules 195 are being violated, an administrator may be alerted.

Figure 2:
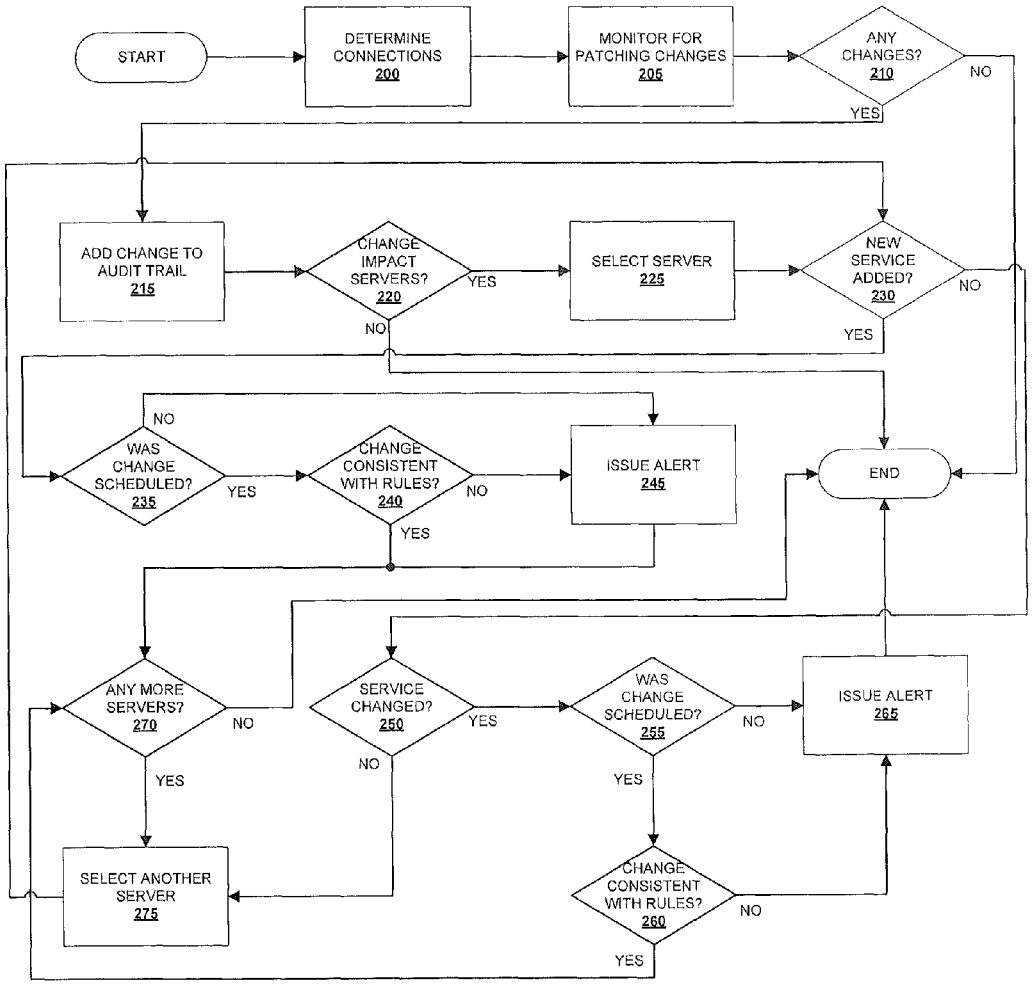
FIG. 2 is a flowchart of operations for monitoring patching changes that alter the services provided to a server in a network in accordance with various embodiments of the present invention.

FIG. 2 is a flow chart illustrating operations for automatically monitoring for unscheduled changes to the network infrastructure. When such an unscheduled change is identified, an alert may be automatically issued if the patching or other hardware change alters the services provided to a server in the network (e.g., one of the servers 115 of FIG. 1).

As shown in FIG. 2, operations may begin with a system such as, for example, the system manager 190 of FIG. 1 reading or otherwise obtaining the current network infrastructure, specifically including the connectivity of end devices throughout the data center (block 200). This may be accomplished, for example, by keeping track of the end devices and cable routing of the network as devices and cables are installed, moved and/or removed, and by using intelligent patch panels 135 and/or switches 140 in conjunction with rack managers 150 in order to track each patching change that is made throughout the network, and periodically or continually providing this information to the system manager 190. Next, the system manager 190 monitors for any changes to the network infrastructure in the data center 100 (block 205). The changes that are monitored for may include, for example, patch cord connectivity changes, cabling changes, installation of new devices (e.g., servers, patch panels, network switches, network services devices, etc.), changing of sub-components (e.g., network cards) within already installed devices, etc. Information about each VLAN may also be automatically accessed or "read" from the network switches 140 to keep track of or "map" the services that are provided to each of the servers 115. Thus, the operations of block 205 may, in some embodiments, include the monitoring of every live channel and every empty channel throughout the data center 100 to identify when any changes occur with respect to that channel.

Next, the system manager 190 may determine when a change occurs in the network infrastructure (block 210) such as the exemplary changes (e.g., a patching change) discussed above. If no changes have occurred, operations may end (although it will be understood that the operations of FIG. 2 will typically be carried out either periodically or continuously). If, instead, it is determined at block 210 that a change in the network infrastructure has occurred, then the change is recorded in an audit trail (block 215). Additionally, the system manager 190 determines if the change impacted the services provided to any of the servers 115 in the data center 100 (block 220). If the change did not impact any server, operations end until the process of FIG. 2 is repeated. If instead it is determined at block 220 that the change did (or may) impact the services provided to any of the servers 115, then the system manager 190 selects a first of the servers 115 (block 225) and carries out appropriate of the operations of blocks 230 through 265 as discussed below.

In particular, at block 230, the system manager 190 determines if the identified change resulted in the provisioning of a new service to the selected server 115 (block 230). If it did, the system manager 190 next checks to see if the selected server 115 was scheduled to receive this new service (block 235). If it was not, an alert is issued (block 245). If the selected server 115 was scheduled to receive this new service, the system manager 190 next checks to determine if the change and/or the provision of the new service to the selected server 115 is consistent with the rules 195 of the data center 100 (block 240). By way of example, the data center rules 195 may specify that certain of the servers 115 and or certain classes or types of servers may not be allowed access to certain types of services (e.g., external connectivity LAN access 180). If the change provisioned such external connectivity LAN service to such a server, the data center rules 195 would have been violated. As another example, the identified network infrastructure change may have been the addition of a piece of equipment to the cabinet 120 that holds the selected server 115 that causes the cabinet loading to violate a data center rule regarding, for example, cabinet weight limits, power consumption or the like. Other examples of rules that might be violated by a change are redundancy rules that specify redundancy requirements for particular devices or channels (e.g., redundant power supplies, redundant network connections, redundant backup devices, etc.), violations of other environmental rules such as rules specifying operating temperature ranges for specific devices, etc. If any violations of the rules 195 are found to have occurred, operations proceed to block 245 where an alert may be issued to notify, for example, a system administrator or technician of the violation of the rules 195.

If instead at block 240 it is determined that the change was consistent with the rules 195, then operations proceed to block 270 to determine if the process has yet to examine the impact of the change on all of the servers 115 in the network. If all of the servers have been examined, then operations end. If not, another server is selected, and the operations of blocks 230 through 265 are repeated for the next server 115.

If, at block 230, it is determined that the change does not result in the provision of a new service to the selected server 115, then operations proceed to block 250 where a determination is made as to whether the network infrastructure change resulted in a change to the services that were already being provided to the selected server 115. Examples of such changes to the services provided to the selected server 115 are changing the connections so that the selected server 115 is moved from one end device to a different end device of the same type (e.g., moving the server 115 from a first memory 165 to a second memory 165) or removing the selected server's 115 access to a particular service (e.g., removing access to a remote console LAN 175). If it is determined that no such changes occurred to the services provided to the selected server, then operations proceed to blocks 270 and 275 where a new server 115 is selected and the operations of blocks 230 through 265 repeated, as appropriate. If instead it is determined at block 250 that a service change has occurred, then operations proceed to block 255 where the system manager 190 determines if the change was a scheduled change. If it was not, an alert is issued (block 265). If the change was scheduled, then the system manager 190 next checks to determine if the change to the service provided to the selected server 115 is consistent with the rules 195 of the data center 100. If it is not, then an alert is issued (block 265) to notify, for example, a system administrator or technician of the violation of the rules 195. If the change is consistent with the data center rules 195, then operations proceed to blocks 270 and 275 where a new server 115 is selected and the operations of blocks 230 through 265 repeated, as appropriate.

Figure 3:
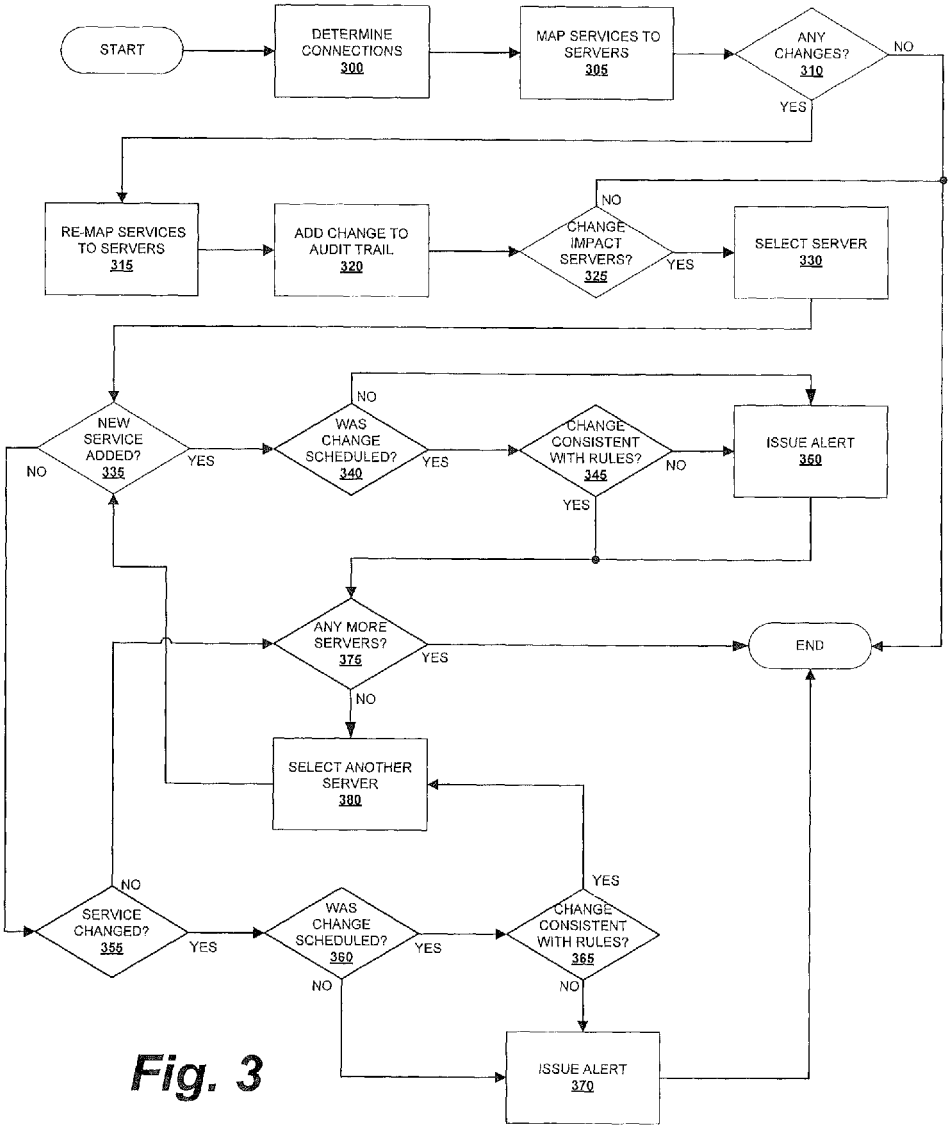
FIG. 3 is a flowchart of operations for issuing an alert when a change is made to a network that alters the services provided to a server in the network in accordance with various embodiments of the present invention.

FIG. 3 is a flowchart of operations for automatically issuing an alert when a change is made to a VLAN that alters the services provided to a server in the network (e.g., one of the servers 115 of FIG. 1) in accordance with various embodiments of the present invention. As shown in FIG. 3, operations may begin by determining the current network infrastructure, specifically including the connectivity of end devices (block 300). This may be accomplished, for example, in the same manner discussed above with respect to block 200 of FIG. 2. Then information about each VLAN is automatically accessed or "read" from the network switches 140 to keep track of or "map" the services that are provided to each of the servers 115 (block 305). As is further shown in FIG. 3, the network switches 140 may be monitored to determine when a change in any of the VLANS occurs (block 310). Illustrative examples of such changes are changing the services provided to a server (e.g., moving a server 115 from a primary LAN to a secondary LAN or from one backup device 170 to another backup device 170), provisioning a new service to a server 115 (e.g., providing the server 115 a connection to a LAN that has Internet access) or removing services that are provided to a server 115. If it is determined at block 310 that no changes have occurred, then operations end. If a change has occurred, then a new mapping is performed to map the new VLANS to specific services (block 315). Then, the system manager 190 determines whether the change in the VLANS has resulted in a change in the services that are provided to any of the servers 115 (block 320). Note that the operations of block 320 may be omitted in some embodiments, since the operations of blocks 325 through 380, described below, may also be used to determine of the change to the VLANS impacted any of the servers 115. However, with respect to some types of changes, the system manager 190 can readily determine that the change will not have impacted any of the servers 115, in which case the operation of block 320 may be used to avoid having to proceed with the operations of 325 through 380.

If at block 325 it is determined that the change in the VLANS did not impact any of the servers 115, then operations may end. However, if the change did impact one or more of the servers 115, then a first of the servers 115 is selected (block 330), and a determination is made as to whether a new service has been provided to this server (block 335). If so, a determination is then made as to whether or not the addition of the new service was scheduled (block 340). If it was not, an alert may then be issued (block 350). If the selected server 115 was scheduled to receive this new service, the system manager 190 next checks to determine if the change and/or the provision of the new service to the selected server 115 are consistent with the data center rules 195 (block 345). As noted above, the data center rules 195 may, for example, specify that certain of the servers 115 and or certain classes or types of servers may not be allowed access to certain types of services (e.g., external connectivity LAN access 180). If the change provisioned such external connectivity LAN service to such a server, the data center rules 195 would have been violated. If any violations of the rules 195 are found to have occurred, operations proceed from block 345 to block 350 where an alert may be issued to notify, for example, a system administrator or technician of the violation of the rules 195. If the change is found to be consistent with the data center rules 195, then operations proceed to block 375 where it is determined if all the servers have been analyzed. If not, operations proceed to block 380 where another server 115 is selected, and the operations starting at block 335 are repeated for that server 115. If all the servers have been analyzed at block 375, then operations end.

If, on the other hand, at block 335 it is determined that the change at the impacted server was not the provision of a new service, then operations instead proceed to block 355, where a determination is made as to whether the change resulted in a change to the services provided to the selected server such as, for example, the removal of a service, or changing an existing service (e.g., changing a connection from a first backup unit to a second backup unit). If not, then operations proceed to blocks 375 and 380, which are discussed above. If the change in the VLANS is determined to have caused a change in the services provided to the server, then a determination is made as to whether the change was a scheduled change (block 360). If it was not, an alert is issued (block 370). If the change was scheduled, a determination is made as to whether or not the change is consistent with the data center rules 195 (block 365). If it is not, an alert is issued (block 370). If the change complies with the rules, then operations again proceed to blocks 375 and 380 and continue until all of the servers 115 in the data center 100 have been checked.

Pursuant to further embodiments of the present invention, the operations of FIG. 3 can also be modified to include security features that detect (and/or prevent) unauthorized changes to the network infrastructure. In particular, not every technician and system administrator that works in the data center 100 will be authorized to make every type of change to the network infrastructure. Accordingly, pursuant to some embodiments of the present invention, the system manager 190 may also monitor who makes configuration changes to the VLAN switches 140 and make a determination if the individual making the change is authorized to make the particular change. By way of example, a core server may have access to an internal LAN but may not have access to any external LANs. The system manager 190 could be programmed so as to only authorize a subset of the technicians and/or system administrators to reconfigure the services provided to the core server so as to give the core server access to an external LAN. Thus, pursuant to embodiments of the present invention, not only can the system manager 190 monitor the services that are provided to each server and issue an alert if the wrong services are provided, it can also monitor who reconfigures the network infrastructure to provision services to each server, and issue an alert if unauthorized personnel attempt to provision servers.

As should be clear from the above discussion of FIGS. 2 and 3, the methods, systems and computer program products according to embodiments of the present invention may rely on intelligent patching capabilities to automatically keep track of the connections across the network so that the system manager 190 constantly keeps track of the connections between end devices through the patching and switching field 130. Moreover, as the system manager 190 can also access and read the VLANS from the network switches 140, the system manager 190 may also keep track of the services that are being provided at any given time to each of the servers 115 throughout the data center 100. This information, along with the ability to continuously monitor the patching connections and VLANS, is then used to identify when changes such as, for example, changes in the patching connectivity or changes in the VLANS occur that alter the services provided to a server. These identified changes can then be analyzed to determine (1) if they were scheduled/authorized changes and (2) whether the changes result in any violations of the network design rules.

Figure 4:
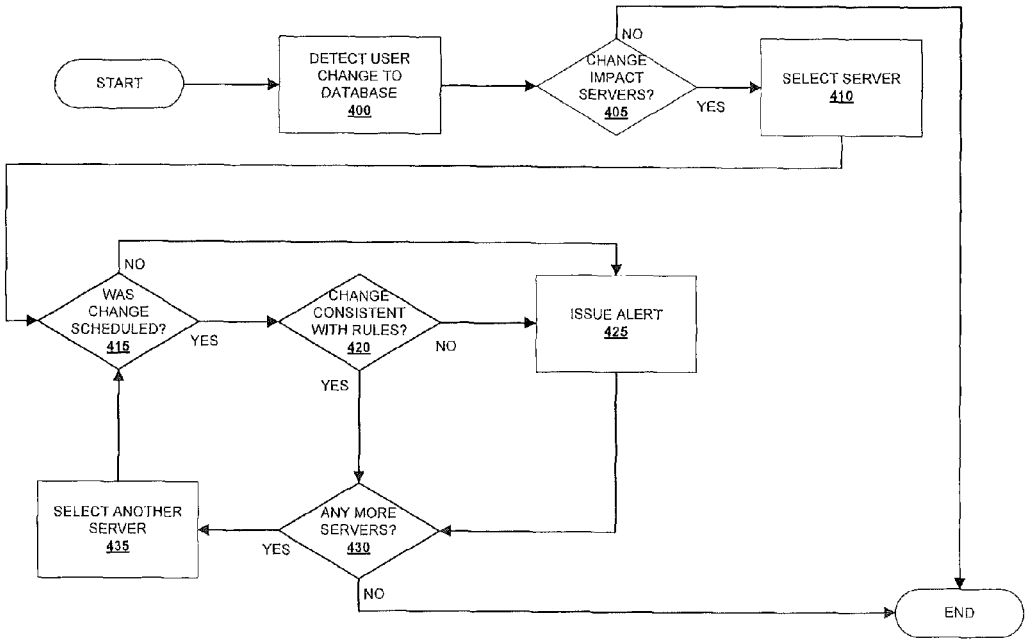
FIG. 4 is a flow chart of operations that may be employed to identify when an administrator makes changes in a system manager that alter the services provided to a server in a network in accordance with various embodiments of the present invention

Pursuant to further embodiments of the present invention, methods, systems and computer program products are provided that can identify where an administrator makes changes in the system manager 190 such as, for example, changes to VLAN assignments, user permissions or electronic work orders, the clearing of alerts, or the movement of cables and patch cords not tracked by intelligent cabling. FIG. 4 is a flow chart of operations that may be used as part of such methods, systems and computer program products. As shown in FIG. 4, operations begin with the system detecting that an administrator or other user has made a change to a database (block 400). By way of example, an administrator may schedule a new service that is to be connected to a server, change the assignment of a VLAN service, or change the cabling or patch cord connections on a switch or panel. The system manager 190 then determines if the change to the database potentially impacted one or more of the servers 115 (block 405). If the change did not impact any server, operations end until the process of FIG. 4 is repeated. If instead, it is determined at block 405 that the change did (or may) impact the services provided to any of the servers 115, then the system manager 190 selects a first of the servers 115 and carries out appropriate of the operations of blocks 415 through 425 as discussed below.

In particular, at block 415, the system manager 190 determines if the identified change was a scheduled change (block 415). If it was not, an alert is issued (block 425). If the change was scheduled, the system manager 190 next checks to determine if the change was consistent with the data center rules 195 (block 420). If any violations of the rules 195 are found to have occurred, an alert is issued to notify, for example, a system administrator or technician of the violation of the rules 195 (block 425).

If instead at block 420 it is determined that the change was consistent with the rules 195, then operations proceed to block 430 to determine if the process has yet to examine the impact of the change on all of the servers 115 in the network. If all of the servers have been examined, then operations end. If not, another server is selected, and the operations of blocks 415 through 425 are repeated for the next server 115.

Figure 5:
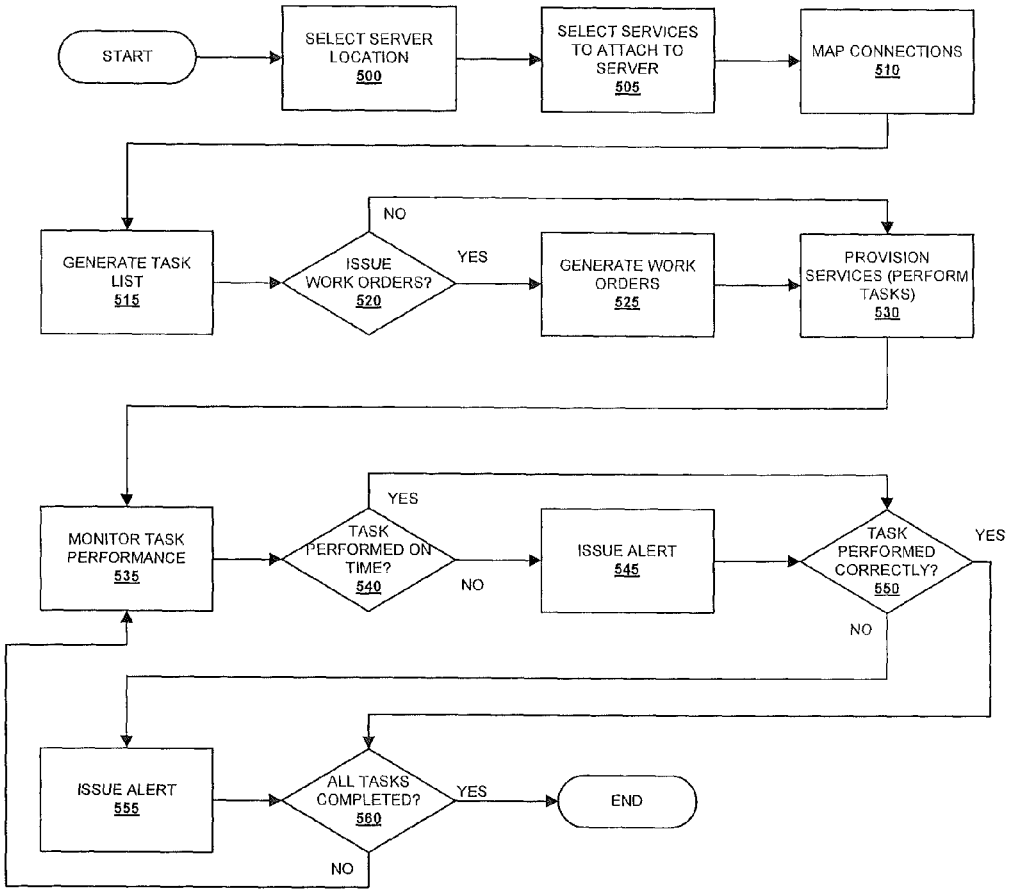
FIG. 5 is a flowchart illustrating methods of deploying a new server in accordance with various embodiments of the present invention.

Pursuant to further embodiments of the present invention, the information regarding the services that are provided to each server in the data center can also be used to assist and help automate the process of deploying new servers in the data center. FIG. 5 is a flow chart illustrating operations for deploying a server that may be used, for example, to deploy new servers 115 in the data center 100 of FIG. 1. As shown in FIG. 5, operations may begin with the selection of a location for the new server 115 (block 500). Such operations are necessary, for example, when new users contract with an Internet data center or when existing users add additional services or capacity or the like. Pursuant to embodiments of the present invention, the system manager 190 may automatically consider a number of different parameters to select a location for the new server 115. These parameters may include, for example, various rules 195 of the data center 100 such as, for example, temperature requirements for the new server 115, weight limitations of various racks and cabinets 120 in which the new server 115 may be deployed, the available power in these racks and cabinets 120 as compared to the power requirements of the new server 115 and various other environmental parameters.

By way of example, the new server 115 may require 10 amps of power, may weigh 12 pounds, and may have a recommended temperature operating range of 10 to 35 degrees Centigrade. The data center rules 195 may limit the amount of amps that may be supplied to any given rack or cabinet, and may likewise have weight limitations for various types of racks and cabinets. The system manager 190 may automatically determine the rack and cabinet locations that have sufficient available power to meet the power requirements of the new server 115 and/or which can receive the new server 115 without violating the data center rules 195 on power per rack/cabinet. The system manager 190 may likewise use real time temperature monitors to identify rack and cabinet locations which have historically been within the recommended temperature operating range for the new server 115. The system manager 190 may also perform calculations based on known average or approximate weights of the devices already mounted in potential racks and cabinets to identify racks and cabinets with sufficient weight margin to hold the new server 115 while staying within the rules 195 of the data center for weight loading of various rack and cabinet types. The system manager 190 may then identify acceptable rack and cabinet locations for the new server 115 that meet the requirements of the new server 115 and/or that comply with the data center rules 195 regarding weight loading, power, etc. The system manager 190 may also automatically select a location for the server based on the number and/or type of hardware and configuration changes that would be required to deploy the set of services to the server to some or all of the available locations.

Next, the system manager 190 determines the services that will be provided or "attached" to the new server 115 (block 505). As noted above, in the data center environment these services may comprise, for example, providing connectivity to a particular LAN such as a LAN having access to outside networks such as the Internet, providing connectivity to memory storage devices, providing connectivity to a backup LAN and/or providing connectivity to a remote console LAN. In some embodiments, the services that are provided to a server may be determined based on a template that specifies the types of services that are provided to each different type of server that is deployed in the data center 100. By way of example, a particular Internet data center might include Internet servers, accounting servers, auction servers, file servers, e-mail servers and a variety of other types of servers. The system manager 190 may be configured to automatically provide a specific bundle of services to each server in the data center, where the services provided are defined based on the type of server. Thus, if the new server 115 is to be used, for example, as a file server, then the system manager 190 will automatically know the services that will need to be provided to this new server 115. It will be appreciated, however, that, in other embodiments, the services that are to be attached to a particular new server may be determined in other ways such as, for example, by direct specification by the person requesting deployment of the new server 115.

The system manager 190 may then attempt to automatically map connections that will provide the necessary services to the new server 115 (block 510). In particular, the system manager 190 will attempt to locate available channels through the patching and switching field 130 that can be used to provide each selected service to the new server 115 without necessitating changes in cabling configurations, the addition of new patch panels or switches etc. Additionally, as part of this operation the system manager 190 determines what new equipment, connections, etc. that must be provided to map the selected services to the new server 115 to the extent that such services cannot be provided through existing equipment and cabling. By way of example, if the new server 115 requires access to a backup device 170, but all of the connections into the available backup devices 170 are already in use, then it may be necessary to install a new backup device and perhaps additional patch panels 135 and/or switches 140 in order to provide backup services to the new server 115. The system manager 190 would determine what new devices are required, and potential locations for such devices.

Next, the system manager 190 may automatically generate a task list that specifies the tasks that need to be performed in order to deploy the selected services to the new server 115 (block 515). This task list may list, for example, each patching connectivity change required, each new device that must be installed, any equipment moves that are required, etc., in order to deploy the selected services to the new server 115. A technician or system administrator can use this list to monitor and/or make sure that each of the necessary tasks are performed so that the selected services are in fact provided to the new server 115.

Next, a determination is made as to whether the system manager 190 will issue paper or electronic work orders (block 520). A work order refers to a list of activities required to connect one or more devices to a communication/data network or required to provide one or more network services. Activities include, but are not limited to, port configuration, installing network equipment, installing patch panels, installing outlets, cabling outlets to panels, adding/removing/moving patch cords, adding/removing/moving devices such as computers and phones, and making changes to a communication/data network on passive connecting hardware (e.g., connecting hardware, consolidation points, panels, etc.). The work orders may be used to assign specific of the items on the task list to technicians (or groups thereof), and will typically specify the task that has to be performed, a deadline for completion of the task, a listing of any other tasks that must be completed in advance, etc. While not all systems may provide the capability of generating electronic work orders, these work orders can increase the efficiency with which tasks on the task list are performed and can also help ensure that various tasks are not inadvertently overlooked and never performed. Electronic work orders may also not be generated for certain types of deployments. For example, if the new server 115 is replacing a similar or identical existing server, then the only necessary tasks may be the replacement of the server, such that electronic work orders are not necessary. As another example, in some instances the changes to the patching connections may be done in advance of the replacement of the server, and hence the patching connectivity may already be in place at the time that the new server 115 is deployed. Under such circumstances, the system manager 190 may not issue electronic work orders.

If electronic (or paper) work orders are to be created, then operations proceed to block 525 where the system manager 190 generates the work orders. Then, operations proceed to block 530, where the tasks necessary to provide the selected services to the new server 115 are performed. As shown in FIG. 5, if work orders are not to be generated, then operations proceed directly from block 520 to block 530. The operations performed at block 530 may comprise, for example, removal of an old server 115, installation of the new server 115, performing the patching changes necessary in the patching and switching field 130 to provide each selected service to the new server 115, installing new patch panels 135 and network switches 140, as necessary, and connecting such new devices to their corresponding rack managers 150, installing any new devices in the network services field 160 that are required to provide the services, and running cables that connect such new devices to the patching and switching field 130.

As shown at block 535 of FIG. 5, the system manager 190 can automatically monitor the changes that are being made throughout the data center 190. As a result, the system manager 190 can determine if any of the changes being made are not done within a specified time period and/or whether or not the changes have been done correctly (e.g., the technician erroneously plugged a patch cord into the wrong connector port when making a patching change that is specified on the task list). If the system manager 190 determines that a change has not been performed in the specified time period (block 540), an alert may be issued (block 545). Likewise, if the system manager 190 is able to recognize that a change that was made was made incorrectly (block 550), an alert is issued (block 555). In this manner, the system manager 190 can automatically determine the changes that need to be made to deploy services to a new server, create a task list of such changes, and then monitor to make sure that the changes are provided correctly and in a timely manner.

The alerts associated with blocks 545 and/or 555 of FIG. 5 may be issued to, for example, a system administrator. The alert may comprise, for example, an electronic message that is transmitted to an administrator via cell phone, pager, wrist watch, PDA, computer, etc. These same types of exemplary alerts may also be used with respect to the alerts discussed in subsequent flow charts of this application. Other types of alerts may also be used. The alert may be issued immediately or can be issued later in time. From block 555, operations proceed to block 560, where a determination is made as to whether or not all of the tasks identified at block 515 have been completed. If so, operations end. If not, operations return to block 535 where monitoring occurs for the next task.

Figure 6:
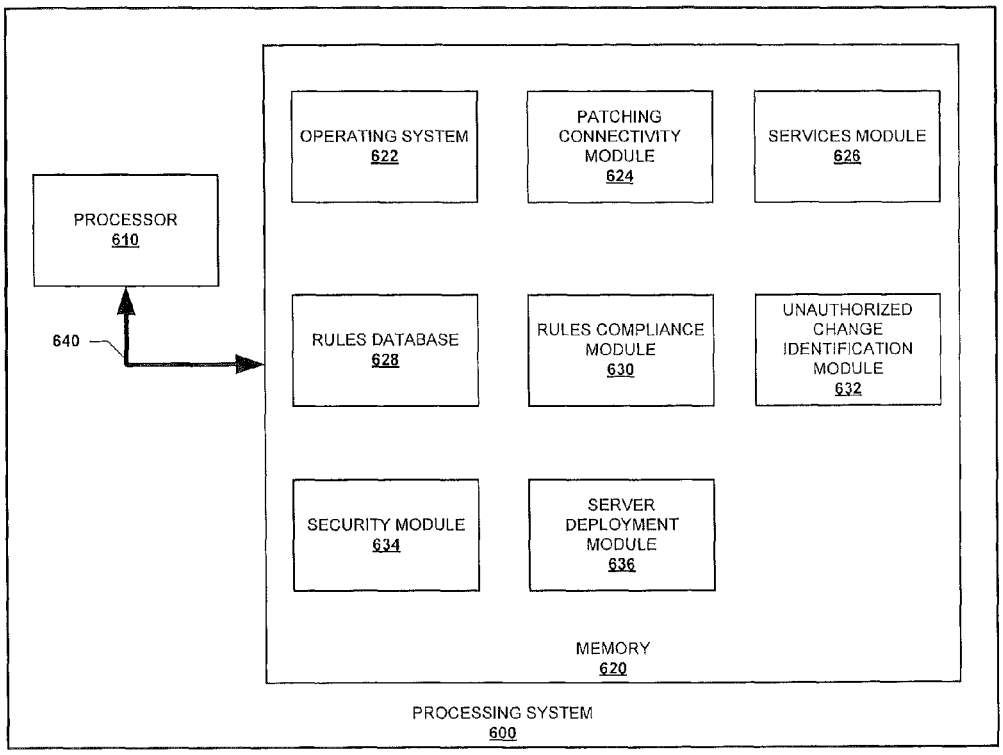
FIG. 6 is a block diagram of a system for automatically monitoring for unscheduled changes to network infrastructure and/or to the services provided to servers according to embodiments of the present invention.

FIG. 6 is a block diagram of a system 600 for automatically monitoring for unscheduled changes to network infrastructure and/or to the services provided to servers according to embodiments of the present invention. As shown in FIG. 6, the system 600 includes a processor 610 and a memory 620. In some embodiments of the present invention, the processor 610 communicates with the memory 620 via an address/data bus 640. The processor 610 may comprise, for example, a commercially available or custom microprocessor. In some embodiments, the system 600 may comprise a personal computer or a server, and the processor 610 may comprise the processor of that personal computer or server, and the memory 620 may comprise the memory of the personal computer and or a memory device associated with and/or available to the server. In any event, regardless of the particular implementation of system 600, the memory 620 is representative of the overall hierarchy of memory devices containing the software and data that is used to automatically monitor changes that are made to the communications connections in a network and/or to automatically issue an alert when an unauthorized change is made to a network that alters the services provided to a server in the network in accordance with some embodiments of the present invention. The memory 620 may include, but is not limited to, the following types of devices: cache, ROM, PROM, EPROM, EEPROM, flash, SRAM, and DRAM.

As shown in FIG. 6, the memory 620 may include an operating system 622, a patching connectivity database module 624, a services database module 626, a rules database module 628, a rules compliance module 630, an unauthorized change identification module 632, a security module 634 and a server deployment module 636. The operating system 622 controls operations of the system 600. For example, the operating system 622 may manage the system's resources and may coordinate execution of programs by the processor 610.

The patching connectivity database module 624 may comprise a database of the current patching connections throughout the network. This database may be intermittently and/or periodically updated to reflect ongoing changes in the network patching connections. The patching connectivity database module 624 may further include information on end devices and cabling connections throughout the network. The patching connectivity database module 624 may be used, for example, to determine the connections in the network and as a baseline comparison for identifying when changes are made to the patching connections.

The services database module 626 may comprise a database of the services that are being provided on each physical channel in the network (or a database of the services that are currently being provided to each server). The services database module 626 may be populated by reading information off of the VLAN switches in the network.

The rules database module 628 comprises a database of rules such as, for example, the data center rules 195 discussed above, that are to be enforced with respect to the network.

The rules compliance module 630 may comprise logic that determines if any changes made to the network infrastructure (e.g., patching connections, equipment deployments, etc.) and/or to the configuration of the switches or other devices that provision services throughout the network comply with the rules specified in the rules database module 628.

The unauthorized change identification module 632 may comprise logic that analyzes a detected change made to, for example, the network infrastructure and/or to the configuration of the switches that provision services throughout the network to determine if the change was a pre-scheduled change. The unauthorized change identification module 632 may be configured to issue an alert if it is determined that a change was not pre-scheduled.

The security module 634 may comprise logic that is configured to identify when administrators or others attempt to make unauthorized changes to a database. The security module 634 may be configured, for example, to carry out the operations of the flow chart of FIG. 4.

The server deployment module 636 may comprise logic that may be used to at least partially automate the process of deploying a new server in a network such as a data center network. The server deployment module 636 may be configured, for example, to carry out some or all the operations of the flow chart of FIG. 5.

Although FIG. 6 illustrates an exemplary software architecture that may facilitate automatically monitoring changes that are made to the communications connections in a network and/or facilitate automatically issuing an alert when an unauthorized change is made to a network that alters the services provided to a server in the network, it will be understood that the present invention is not limited to such a configuration but is intended to encompass any configuration capable of carrying out the operations described herein.

Pursuant to still further embodiments of the present invention, methods, systems and computer program products are provided for monitoring virtual server services. In particular, in data centers and other operations, applications may now be moved from, for example, one server to another server without installation. This ability to move applications between servers without installation is commonly referred to as "virtual server" services, and may provide a data center or other operation greatly increased flexibility in terms of satisfying processing requirements. However, when moving applications between servers without installation, it may be necessary to ensure that the server to which a particular application is to be moved can provide all of the services that are required by the application at issue such as, for example, Internet access, any requisite redundancy or back-up power requirements, etc. Moreover, a particular application may also have specified "prohibited services", which are services that should not be connected to the server running the application. For example, for certain applications, it may be required that the server running the application not have any physical Internet connectivity to ensure that an accidental connection to the Internet cannot be made.

Figure 7:
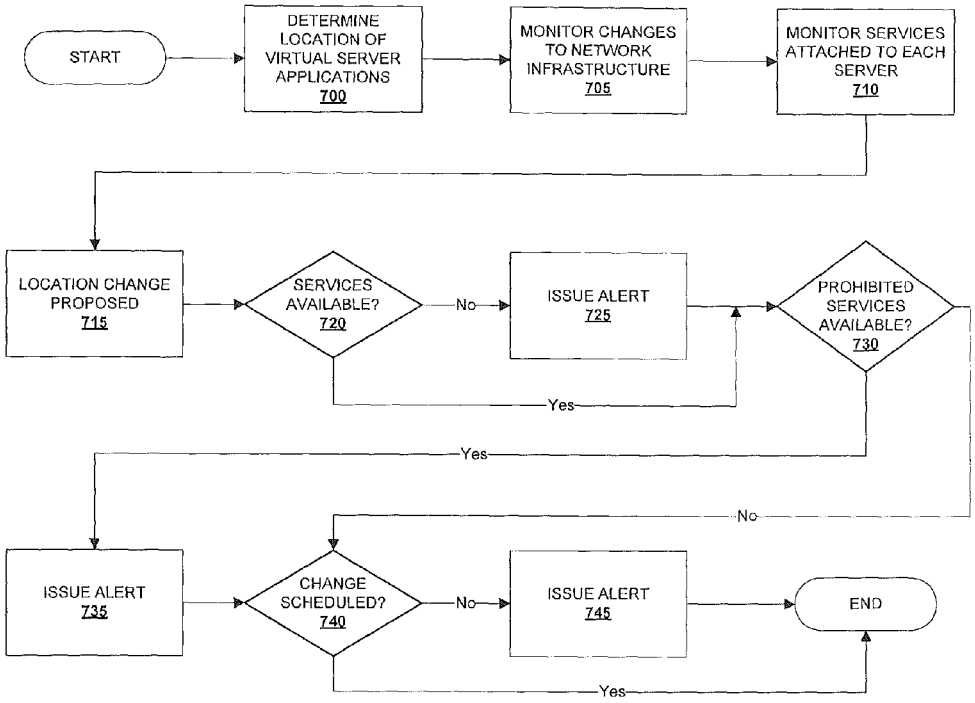
FIG. 7 is a flowchart of operations for monitoring virtual server services in accordance with various embodiments of the present invention.

FIG. 7 is a flow chart illustrating operations for monitoring virtual server services according to certain embodiments of the present invention. As shown in FIG. 7, operations may begin with a system such as, for example, the system manager 190 of FIG. 1, determining the "location" (i.e., the server or other processing device that the application is presently running on) of each virtual server application that is being run in the data center 100 or other operation (block 700). This may be accomplished, for example, by the system manager 190 maintaining a database that keeps track of the location of each virtual server application.

At block 705 of FIG. 7, the system manager 190 (in conjunction with intelligent patch panels 135, switches 140 and/or rack managers 150) monitors the network switches 140 and rack managers 150 to identify and track any changes in the network infrastructure such as, for example, patch cord connectivity changes, cabling changes, installation of new devices, changing of sub-components within already installed devices, etc. At block 710, the system manager 190 monitors and keeps track of the services that are attached to each server in the network, such as the servers 115 of FIG. 1 by, for example, reading information about each VLAN from the network switches 140 to map the services that are provided to each of the servers 115.

At block 715 of FIG. 7, a location change is proposed for a virtual server application whereby a particular virtual application will be moved, for example, from one server to another server. This location change may be proposed, for example, by an administrator or may be automatically proposed by the system. At block 720, the system manager 190 would check to determine that the services that are required by the virtual server application are available at the server 115 that the application is to be moved to. This may be accomplished, for example, by comparing a list of required services for the virtual server application to the database of services that are attached to each server in the network that may be maintained as part of the operations at block 710. If, at block 720, it is determined that any required services are not available, then an alert is issued (block 725).

If it is determined at block 720 that all of the required services are available at the server 115 that the application is to be moved to, then operations proceed to block 730 where the system manager 190 checks to determine if any "prohibited services" are available at the server 115 that the application is to be moved to. If so, then an alert is issued (block 735). If, on the other hand, it is determined at block 730 that the server 115 that the application is to be moved to does not have any services that are prohibited by the virtual server application, then operations proceed to block 740 where a determination is made as to whether the change moving the virtual server application from the first server to the second server was scheduled. If not, an alert is issued at block 745. If instead the change was scheduled, then the change is allowed and operations may end. The system manager may then continue with the monitoring operations of blocks 700 through 710 in anticipation of the next proposed location change for a virtual server application.

It will be appreciated that the operations for monitoring virtual server services may be carried out in a different order than is shown in the example of FIG. 7. By way of example, the operations of blocks 700, 705 and 710 may be carried out in any order. Likewise, it will be appreciated that multiple of the operations shown in FIG. 7 may be carried out as a single step. For example, the determinations made in blocks 720, 730 and 740 of FIG. 7 may be carried out in a single step (or two steps), and a single alert may be issued if any of the alert generating conditions are satisfied.

Certain embodiments of the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. The computer-usable or computer-readable medium may be, for example but not limited to, an electronic, magnetic, optical, electromagnetic, infrared, or semiconductor system, apparatus or device including, for example, a random access memory (RAM), a read-only memory (ROM), an erasable programmable read-only memory (EPROM or Flash memory), and a portable compact disc read-only memory (CD-ROM).

Computer program code for carrying out operations of the system 600 discussed above with respect to FIG. 6 may be written in a high-level programming language, such as C or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller. Embodiments of the present invention are not limited to a particular programming language.

In the drawings and specification, there have been disclosed embodiments of the invention and, although specific terms are employed, they are used in a generic and descriptive sense only and not for purposes of limitation, the scope of the invention being set forth in the following claims.

That which is claimed is:

1. A method of deploying a server in a data center, the method comprising:

receiving a request to deploy the server in the data center;

automatically identifying a plurality of acceptable rack and/or cabinet locations for the server that comply with a set of data center rules;

determining a set of services that are to be provided to the server;

automatically selecting a rack or cabinet location for the server from the plurality of acceptable rack and/or cabinet locations based on a number [and/or] type of hardware and configuration changes that would be required to deploy the set of services to at least some of the acceptable rack and/or cabinet locations;

automatically mapping connections through a patching and switching field [that includes a plurality of intelligent patch panels and a plurality of switches] that will provide the set of services to the server; and deploying the server at the selected location.

2. The method of claim 1, wherein determining the set of services that are to be provided to the server comprises:

determining a server type for the server; and determining the set of services that are to be provided to the server based on a template that specifies the services that are provided to different server types and the server type of the server.

3. The method of claim 2, further comprising automatically issuing work orders for at least some of the hardware and configuration changes that are necessary to deploy the server at the selected rack or cabinet location and to provide the set of services to the server.

4. The method of claim 2, further comprising automatically monitoring to determine if the hardware and configuration changes that are necessary to deploy the server at the selected rack or cabinet location and to provide the set of services to the server are performed correctly.

5. The method of claim 4, further comprising automatically monitoring to determine if each of the hardware and configuration changes that are necessary to deploy the server at the selected rack or cabinet location and to provide the set of services to the server are performed within respective pre-specified time periods.

6. The method of claim 5, issuing an alert if the hardware and configuration changes that are necessary to deploy the server at the selected rack or cabinet location and to provide the set of services to the server are not performed correctly and/or are not performed within the respective pre-specified time periods.

7. The method of claim 6, wherein the alert comprises an electronic message.

8. The method of claim 2, further comprising determining if a user entering the request to deploy the server has the authority to deploy the server.

9. The method of claim 2, wherein the set of data center rules include at least one of a weight limitation or power limitation for an equipment rack or cabinet.

10. The method of claim 2, further comprising automatically generating a task list that specifies the tasks that need to be performed in order to deploy the services in the set of services to the server, wherein the tasks include at least one patching connectivity change.

11. A method of deploying a server in a data center that will receive a set of services, the method comprising:

receiving a request to deploy the server in the data center;

automatically selecting a location for the server based at least in part on power requirements for the server, a recommended temperature operating range for the server, available power at potential equipment rack and/or cabinet locations, historical temperature data at the potential equipment rack and/or cabinet locations and [the] *a* number and/or type of hardware and configuration changes that would be required to deploy the set of services to the server to some or all of [the] potential equipment rack and/or cabinet locations;

automatically determining the hardware and configuration changes that are necessary to deploy the server at the selected location and to provide the set of services to the server; and then deploying the server at the selected location.

12. The method of claim 11, further comprising determining the services that will be provided to the server prior to automatically selecting the location for the server based on the set of rules.

13. The method of claim 12, wherein the services that will be provided to the new server are determined based on a template and a type of the server.

14. A method of deploying a server in a data center that will receive a set of services, the method comprising:

[receiving a request to deploy the server;

automatically determining acceptable rack and/or cabinet locations for the server that comply with a set of data center rules;

automatically selecting a location for the server based on a set of rules;]

automatically determining [the] *whether* hardware and configuration changes [that] *to establish network connections* are necessary to deploy the server at [the selected location] *at least some of the locations of a plurality of locations* and to provide [the set of] services to the server[.] *at the at least some of the locations of the plurality of locations;*

*automatically selecting one of the locations for the server from the plurality of locations based at least in part on a number of hardware and configuration changes needed to deploy the services to the server; and* automatically mapping *network* connections through a patching and switching field that includes a plurality of patch panels and a plurality of switches that will provide the [necessary] services to the server.

15. The method of claim 14, wherein automatically mapping connections that will provide the [necessary] services to the server comprises determining what new equipment and connections are necessary to deploy the services [in the set of services] to the server.

*16. The method of claim 14, further comprising:*

*receiving a request to deploy the server;*

*automatically determining acceptable rack and/or cabinet locations for the server that comply with a set of data center rules; and*

*automatically selecting the location for the server based on the set of data center rules.*

*17. The method of claim 14, further comprising:*

*automatically tracking end-to-end connections between the server and at least one end device through the data center.*

*18. The method of claim 14, wherein the services to the server are services provided by end devices.*

*19. The method of claim 18, wherein the end devises are at least one of memory devices, backup devices, remote consoles and external connectivity local area networks.*

*20. The method of claim 14, further comprising:*

*determining hardware and configuration changes necessary to deploy the server.*

*21. The method of claim 20, wherein determining hardware changes includes determining at least one of patch panels, switches and network equipment changes necessary to deploy the server.*

* * * * *